July 11, 1944.　　　D. B. WHITNEY　　　2,353,531
CAP SCREW
Filed May 3, 1943
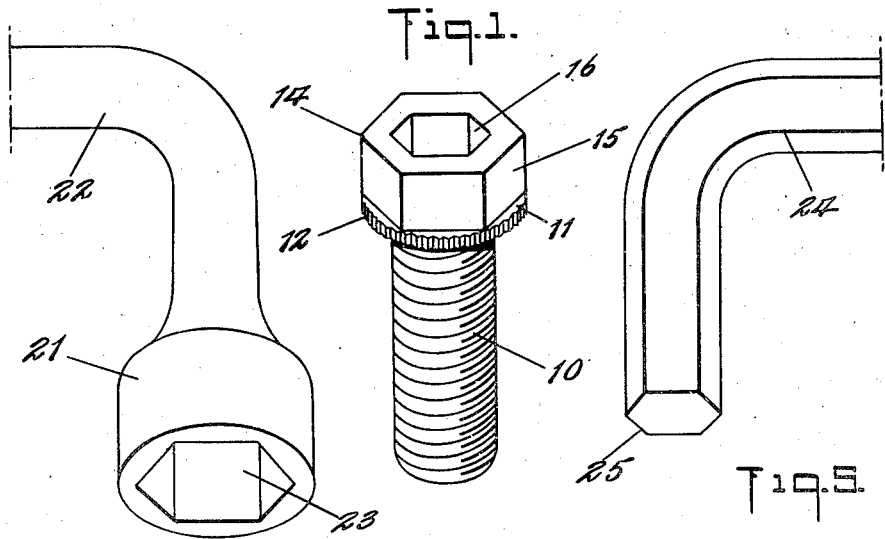
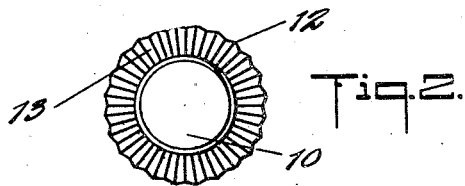
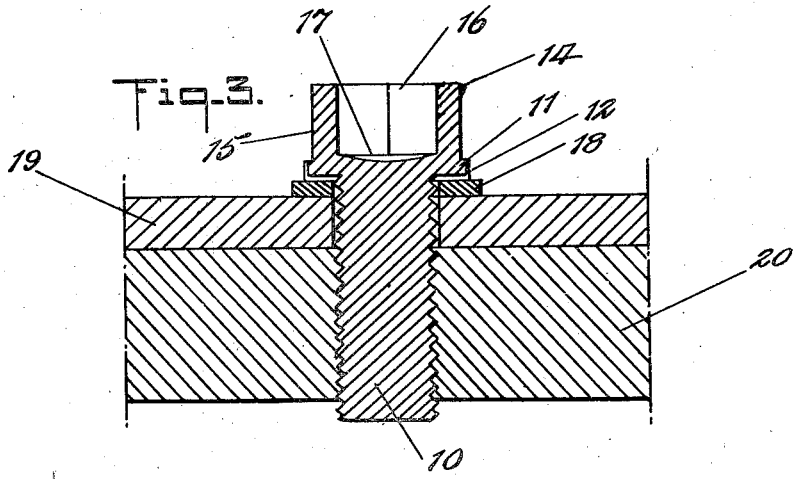
INVENTOR
DAVID B. WHITNEY
BY H. G. Manning
ATTORNEY Patented July 11, 1944

2,353,531

UNITED STATES PATENT OFFICE 2,353,531

CAP SCREW

David B. Whitney, Waterbury, Conn.

Application May 3, 1943, Serial No. 485,465

4 Claims. (Cl. 85—45)

This invention relates to screws, and more particularly to a socket-head cap screw which may be driven either from the inside of the socket or the interior of the screw head.

One object of this invention is to provide a cap screw of the above nature in which the head and socket are both formed of hexagonal shapes.

A further object is to provide a cap screw of the above nature in which provision is made of a cylindrical vertically ribbed flange at the base of the head to facilitate the manipulation thereof.

A further object is to provide a cap screw of the above nature in which the undersurface of the knurled flange has radial ribs whereby a plurality of angular self-cleaning grooves will be provided throughout the circumference of the base of the screw head.

A further object is to provide a cap screw of the above nature which will be simple in construction, inexpensive to manufacture, easy to install and manipulate, compact, ornamental in appearance, and very efficient and durable in use.

With these and other objects in view there has been illustrated on the accompanying drawing one form in which the invention may conveniently be embodied in practice.

In the drawing:

Figure 1 represents a perspective view of a cap screw embodying the invention.

Figure 2 is a bottom view of the same, looking upwardly.

Figure 3 is a longitudinal sectional view of the cap screw as it appears when installed in an aperture of a base member, and showing a plate and washer secured to said base member by said screw.

Figure 4 is a perspective view of an offset angular socket wrench for use in driving the outside of the head of the cap screw.

Figure 5 is a similar perspective view of an interior hexagonal offset wrench for driving the cap screw from the interior socket thereof.

Referring now to the drawing in which like reference numerals denote corresponding parts throughout the several views, the numeral 10 indicates the cylindrical threaded shank of the improved cap screw, said shank being connected integrally to a cylindrical enlarged flange 11 having a plurality of vertical ribs 12 throughout the periphery thereof. The flange 11 is also provided on the undersurface thereof with a plurality of horizontal radial ribs 13, which ribs are in alignment with the vertical ribs 12 so as to provide a series of angular self-cleaning grooves around the entire periphery of the base of said flange.

Above the flange 11 the cap screw is provided with a head 14 integrally connected with the flange 11, said head having a hexagonal exterior surface 15 and a hexagonal interior socket 16, the faces of said hexagonal socket 16 and exterior surface 15 being in parallelism. The hexagonal head is coaxial with said shank 10 and flange 11 and the six corners of the outside surface of said head lie flush with the periphery of said flange. The bottom 17 of the socket 16 is preferably made concave in shape, as shown in Figure 3.

One advantage of the angular grooves on said flange is that they will also serve to hold lubricant and prevent rusting so as to permit ready removal of the screw. These grooves also permit the easy penetration of rust-removing liquids to release said screw when frozen into its socket.

The cap screw may be employed in various ways, but one example of the use of said screw is shown in Figure 3, wherein the numeral 18 indicates a soft copper washer located under the flange 11, said washer resting upon an apertured thin flat plate 19, which in turn rests upon an apertured base member 20, as clearly shown in said figure.

Operation

In operation, when it is desired to use the cap screw for securing the plate 19 to the base member 20, the head 14 of the cap screw may be engaged either by an exterior wrench 21 having an angular offset handle 22 connected therewith and also provided with an enlarged hexagonal socket 23 shaped to fit the exterior surface 15 of the hexagonal head 14; or the head 14 of the cap screw may be driven by an interior wrench 24 formed of hexagonal stock and provided with a vertical shank 25 and an angular offset handle 26.

It will also be understood that if desired the cap screw may be driven by any other types of wrenches which will fit either the exterior or interior of the hollow hexagonal head of the cap screw.

While there has been disclosed in this specification one form in which the invention may be embodied, it is to be understood that this form is shown for the purpose of illustration only and that the invention is not to be limited to this specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a cap screw, a cylindrical threaded shank, an enlarged hexagonal head integral with said shank, said head having a hexagonal interior socket extending downwardly from the upper face thereof, the outer surface of said head being also hexagonal, said cap screw being provided with an enlarged cylindrical flange intermediate said shank and said head, said flange being provided with vertical exterior ribs and horizontal radial ribs on the undersurface thereof, said vertical and horizontal ribs being in alignment, whereby a plurality of angular self-cleaning grooves are provided throughout the circumference of said flange.

2. In a screw, a cylindrical threaded shank, a cylindrical flange on said shank, said flange being provided with vertical ribs on its outer surface and horizontal radial ribs on the undersurface thereof, said outer and radial ribs being in alignment whereby a plurality of angular self-cleaning grooves are provided on said flange, and means on said screw for driving it.

3. In a cap screw, a cylindrical threaded shank, an enlarged polygonal head integral with said shank, a cylindrical flange integral with said shank located adjacent the base of said head and having its circumference coincident with the apexes of said polygonal head whereby it may be inserted in a cylindrical socket member, said flange being provided with vertical ribs on its outer surface and horizontal radial ribs on its under-surface in alignment with said vertical ribs whereby a plurality of angular self-cleaning grooves are provided on the periphery of said flange.

4. In a threaded screw member, an outer cylindrical flange integral therewith, said flange having vertical ribs on its outer surface and horizontal radial ribs on its undersurface in alignment with said vertical ribs whereby a plurality of self-cleaning grooves are provided on said flange to permit the entrance of a rust-softening liquid to release said member when the threads thereof are "frozen" on a cooperating threaded member, said vertical ribs comprising means to permit manual driving of said screw member.

DAVID B. WHITNEY.